United States Patent [19]
Wright

[11] 3,944,897
[45] Mar. 16, 1976

[54] CONTROL CIRCUITS FOR ELECTRICALLY DRIVEN VEHICLES

[75] Inventor: Maurice James Wright, Birmingham, England

[73] Assignee: Joseph Lucas (Industries) Limited, Birmingham, England

[22] Filed: June 14, 1974

[21] Appl. No.: 479,555

[30] Foreign Application Priority Data
June 30, 1973 United Kingdom............... 31313/73

[52] U.S. Cl................................. 318/139; 318/269
[51] Int. Cl.²................................................ H02P 7/06
[58] Field of Search........................... 318/139, 269

[56] References Cited
UNITED STATES PATENTS
3,297,930  1/1967  Payne .................. 318/269
3,725,758  4/1973  Loyk .................... 318/269
3,855,512  12/1974  Konrad ............. 318/139 X Primary Examiner—Robert K. Schaefer
Assistant Examiner—W. E. Duncanson, Jr.
Attorney, Agent, or Firm—Holman & Stern

[57] ABSTRACT

In a control circuit for an electrically driven vehicle, a traction motor drives the vehicle and there are contactors so that the motor can provide forward drive or electrical braking. The current in the motor armature is controlled by a pedal which also controls the contactor means. The action of the pedal can be modified in accordance with the position of the brake pedal of the vehicle.

4 Claims, 9 Drawing Figures

CONTROL CIRCUITS FOR ELECTRICALLY DRIVEN VEHICLES

This invention relates to control circuits for electrically driven vehicles.

A control circuit according to the invention comprises in combination a traction motor for driving the vehicle, contactor means for connecting the motor in circuit to provide forward drive or electrical braking, control means determining the current in the motor armature, and a control pedal controlling both the contactor means and the control means.

Using an arrangement as specified above, forward drive or electrical braking will be provided depending on the position of the pedal, and moreover the current in the motor will also depend on the pedal position. Such an arrangement can be made to simulate the effect of engine braking in a vehicle driven by an internal combustion engine.

An example of the invention is illustrated in the accompanying drawings, in which.

Figure 1:
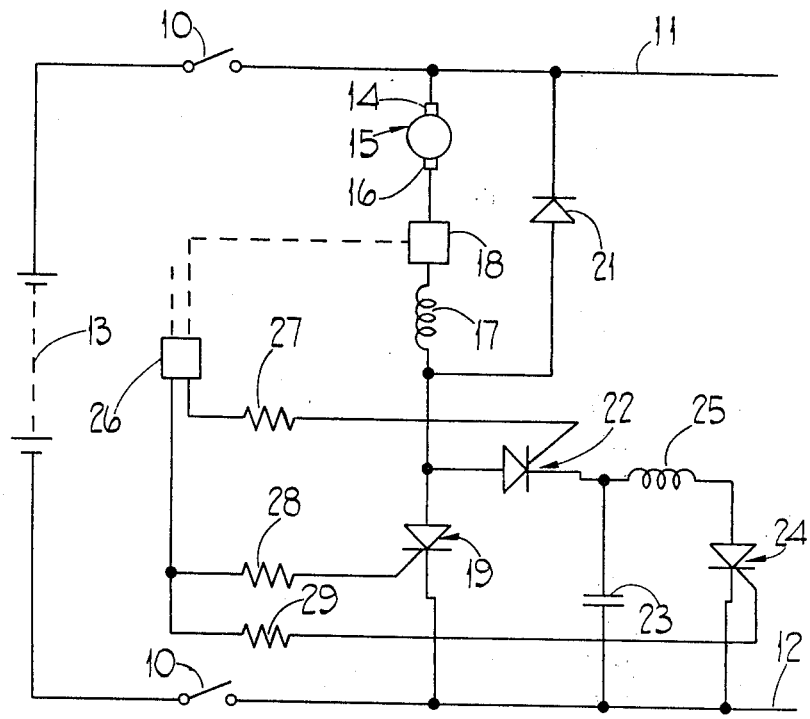
FIGS. 1 to 3 are circuit diagrams of a control circuit for an electrically driven vehicle showing three alternative connections of the circuit respectively.

Referring first to FIG. 1, there are provided positive and negative supply lines 11, 12 connected through contacts 10 to the traction battery 13 of the vehicle. Typically, the battery 13 has a voltage in excess of 200 volts. Connected to the line 11 is one end 14 of the armature of a series wound traction motor 15, the other end 16 of the armature being connected to the line 12 through a series circuit including a current sensing device 18, the field winding 17 of the motor 15 and the anode-cathode path of a thyristor 19. The series combination of armature, device 18 and winding 17 is bridged by a freewheel diode 21, and the junction of the winding 17 and thyristor 19 is connected to the anode of a thyristor 22, the cathode of which is connected to the line 12 through a capacitor 23. The capacitor 23 is bridged by an inductor 25 and the anode-cathode path of a thyristor 24 in series. The thyristors 19 and 24 have their gates connected through resistors 28, 29 respectively to one output terminal of a control unit 26, the unit 26 having a second output terminal which is connected through a resistor 27 to the gate of the thyristor 22.

FIG. 1 shows the circuit connections when the vehicle is being driven in a forward direction. The accelerator pedal of the vehicle operates a potentiometer which produces an output representing the demanded current level in the motor. This output signal is converted to two signals representing an upper current level and a lower current level respectively, and these two signals are sensed by the control unit 26, which also receives a signal from the device 18. When the current flow in the motor reaches the upper level, the thyristor 19 is turned off, and when the current flow falls to the lower level, the thyristor 19 is turned on again. The operation of the circuit to control the thyristor 19 is best explained by commencing at a point in the cycle of operations when the thyristors 19 and 24 are off, and the thyristor 22 is conducting and charging the capacitor 23. When the capacitor 23 is charged, current flow through the thyristor 22 reduces to zero and so the thyristor 22 turns off. Since the thyristor 19 is not conducting, the current flow in the device 18 will be decreasing, and when the current reaches the lower level, the unit 26 produces an output to turn on the thyristor 19 and the thyristor 24. Conduction of the thyristor 24 causes the charge on the capacitor 23 to be reversed, after which the thyristor 24 turns off. The capacitor 23 is now charged with its lower plate positive and its upper plate negative. Conduction of the thyristor 19 causes current to flow in the armature 15 and the winding 17, and the current flowing in the device 18 now increases until it reaches the upper level. When this upper level is reached, the control unit 26 produces an output to turn on the thyristor 22, permitting discharge of the capacitor 23 with the result that the thyristor 19 is turned off. The capacitor 23 now charges again through the thyristor 22 and the cycle is repeated.

Figure 2:
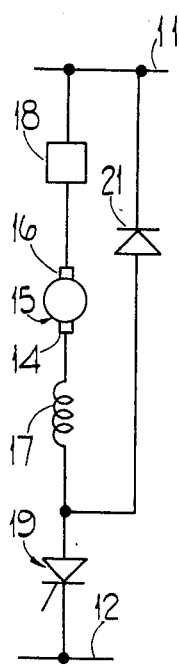
Figure 3:
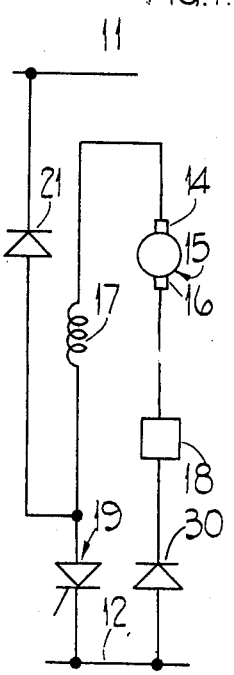

In the arrangment being described, it is also possible to use the motor to brake the vehicle electrically, and to use the motor to drive the vehicle in reverse. FIG. 1 does not show the various contactor arrangements which are used for this purpose, but FIGS. 2 and 3 show the circuit connections when these contactors are in the appropriate position. Thus, FIG. 2 shows the arrangement when the vehicle is to be driven in reverse. The circuit connections are the same as in FIG. 1, except that the end 16 of the motor 15 is now connected to the line 11 through the device 18 and the other end 14 is connected to the winding 17. The operation is exactly the same as in FIG. 1, except that the motor is driven in the reverse direction.

FIG. 3 shows the circuit connections when the motor is being used to brake the vehicle electrically. The end 14 of the motor is connected to the winding 17 as in FIG. 2, but the end 16 is now connected to the line 12 through the device 18 and an additional diode 30 in series. When the motor is being used to brake the vehicle, the current in the motor armature will be controlled in the same way as described with reference to FIG. 1. In this case, however, the motor 15 acts as a generator and charges the battery by way of the diodes 21 and 30.

Figure 4:
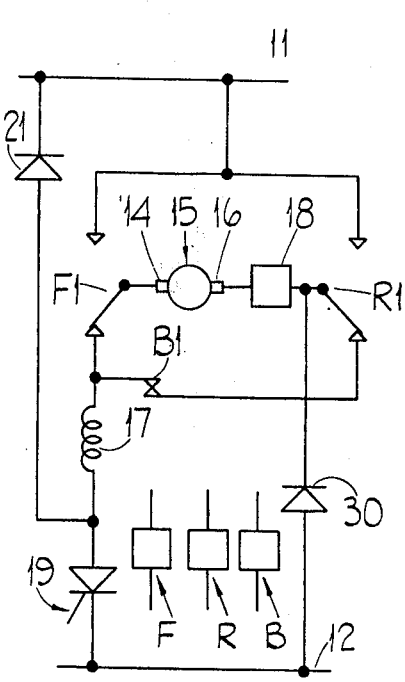
FIG. 4 illustrates one arrangement of contactors for producing the connections shown in FIGS. 1 to 3.

There are various contactor arrangements that can be used to produce the arrangements shown in FIGS. 1 to 3, but one possible arrangement is shown in FIG. 4. The basic controls of the vehicle are the accelerator pedal, which when depressed operates a potentiometer as previously explained, the brake pedal which provides normal hydraulic braking for the vehicle, and a selector switch which has a central off position but in movable in opposite directions from the off position to select forward or reverse movement of the vehicle. In FIG. 4 three contactor operating devices F, R, B are shown. If the selector switch is in the forward position and the accelerator pedal is depressed, then depending on the position of the accelerator pedal either the device F will be energised and will operate a contact F1 which normally occupies the position shown in the drawing but when the device F is energised moves to its alternative position in which it connects the circuit in the manner indicated in FIG. 1, or the device B is energised to open the contact B1. The contacts F1 and R1 will be in the positions shown, and so it will be seen that the circuit now has the form shown in FIG. 3, so that electrical braking is provided as explained above.

If, on the other hand, the selector switch is moved to its reverse position and the accelerator pedal is depressed, then the device R is energised and a contact R1 is moved from the position shown to its alternative position, at which point the circuit is in the form indicated in FIG. 2.

Although the arrangements shown in FIGS. 1 to 4 relate to a series motor, they can also be applied to shunt and compound motors. In this case, the arrangements described will control the armature current.

Figure 5:
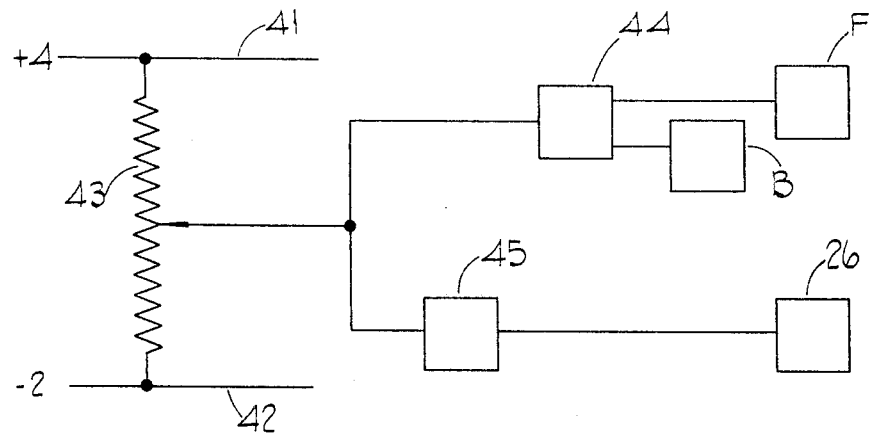
FIG. 5 is a block diagram illustrating part of the control arrangement for use with FIGS. 1 to 4.

Referring now to FIG. 5, the vehicle includes a low voltage source, typically a 24 volt battery, from which are derived positive and negative supply lines 41, 42 which in the example shown in FIG. 5 are of +4 and −2 volts respectively. Connected across the lines 41, 42 is a resistor 43 over which moves a slider controlled by the accelerator pedal of the vehicle. This slider provides an input to a polarity sensitive circuit 44, and also provides an input to a rectifier 45 which in turn provides an input signal to the unit 26.

The selector switch previously referred to can be moved to a reverse or a forward position, and when the reverse position of the selector switch is selected, the circuit 44 has no effect on the operation and only the device R is energised. However, in considering FIG. 5 it will be assumed that the selector switch is in the forward position. Depending on the position of the accelerator pedal, the voltage at the slider will either be positive or negative, and the polarity of this voltage is sensed by the circuit 44. If the voltage is positive, the device F is energised to provide forward drive. If the voltage is negative, the device B is energised to provide electrical braking. Whatever the polarity of the voltage, the rectifier 45 provides an input to the unit 26 which represents the magnitude of the voltage at the slider. The unit 26 sets the upper and lower current limits as previously explained, and so it will be appreciated that the unit 26 takes no account of whether the motor is driving the vehicle or providing electrical braking.

Figure 6:
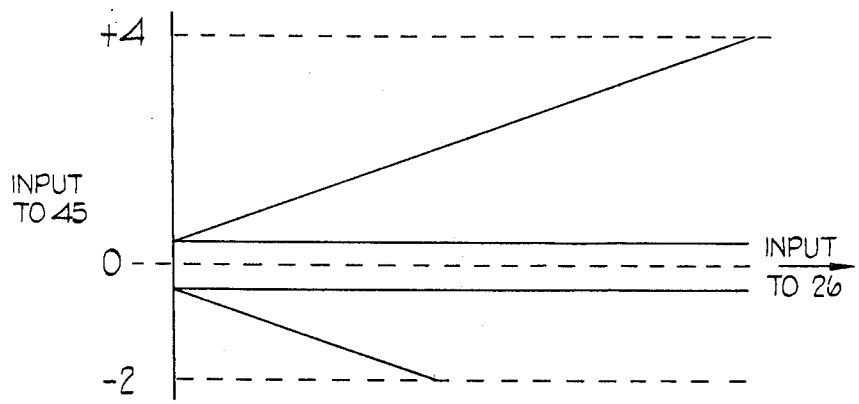
FIG. 6 is a graph illustrating the operation of the arrangement shown in FIG. 5.

The effect of the rectifier 45 is seen in FIG. 6. The rectifier 45 has a small dead band close to zero volts, and in this dead band no input is provided to the unit 26. If the voltage is positive, a rising positive input is provided to the unit 26 as the accelerator pedal is depressed further, the maximum value of this voltage being 4 volts, which represents a predetermined maximum current flow in the armature. If the accelerator pedal is slowly released, then the maximum armature current is limited to the current which results from an input of 2 volts to the unit 26.

Figure 7:
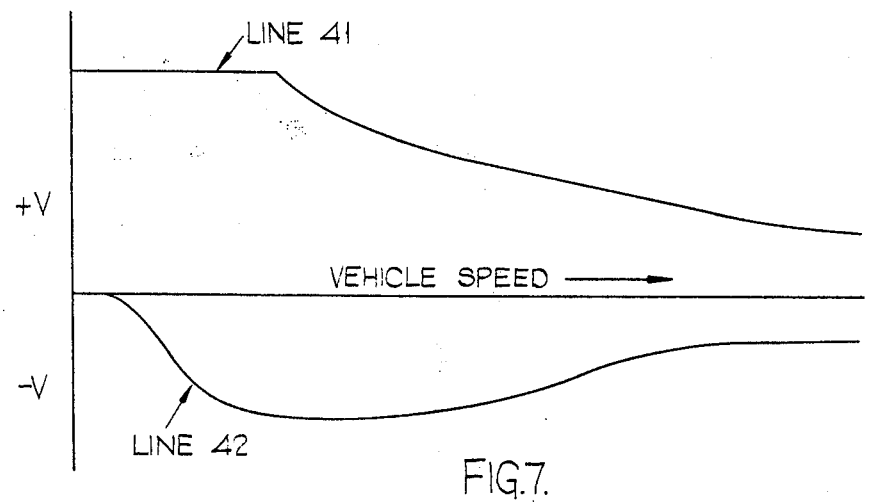
FIG. 7 is a graph illustrating a modification.

It is preferred that the maximum armature current should vary with vehicle speed, and also that the maximum armature currents for forward motion and forward braking should vary independently of each other. This can be achieved by varying the potentials on the lines 41 and 42 with speed in any convenient manner, and FIG. 7 shows a possible characteristic. The potential on the line 41 is high at low vehicle speeds, so that substantial armature current is permitted. The potential then falls off with increasing vehicle speed. The shape of the line 42 for electrical braking is completely different, and it will be noted that no electrical braking is possible at very low vehicle speeds, and that maximum electrical braking is available at intermediate speeds.

Figure 8:
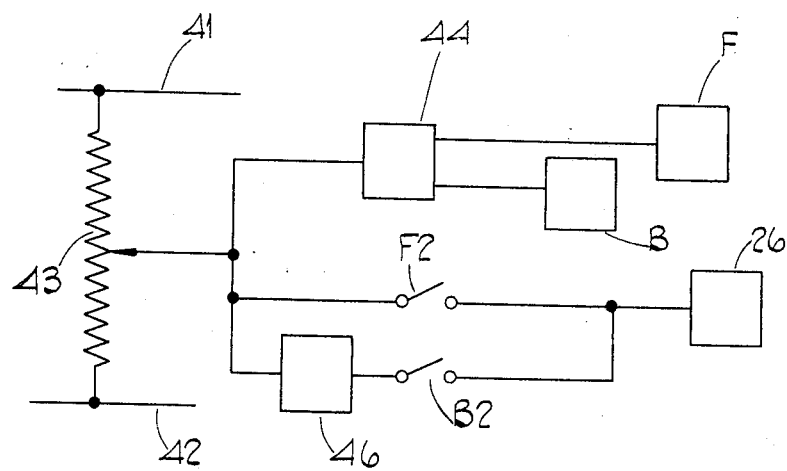
FIG. 8 is a block diagram illustrating a modification of the arrangement shown in FIG. 5.

Turning now to the example shown in FIG. 8, instead of a rectifier 45, the slider is connected to the unit 26 through a normally open contact F2 which is closed when the device F is energised. The contact F2 is bridged by a series circuit including an inverter 46 and a normally open contact B2 which is closed when the device B is energised. When the voltage at the slider is positive, then the device F will be energised, the contact F2 will close and a positive input will be provided to the unit 26. When the voltage at the slider is negative, the device B will be energised, and the contact B2 will close so that the negative voltage is inverted and then applied to the unit 26, so that the unit 26 again receives a positive input. As compared with FIG. 5, this arrangement has the advantage that whenever a change is made from energisation of a device F or B to energisation of the other device B or F, there will be a period during which the input to the unit 26 demands zero current so that the current flowing through the armature reduces before the contactors close again.

Figure 9:
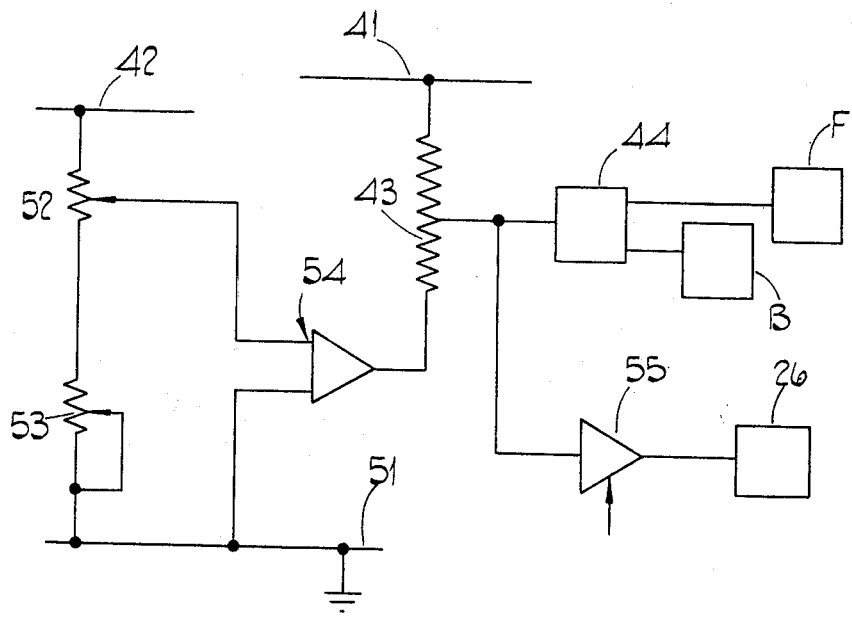
FIG. 9 is a block diagram similar to FIG. 8 of another example.

In the example so far described, the brake pedal of the vehicle effects hydraulic braking, but does not influence the the electrical braking. In the arrangement shown in FIG. 9, however, the electrical braking is modified by the position of the brake pedal, so that a family of braking curves are obtained, depending on the position of the brake pedal. As shown in FIG. 9, the positive line 41a is connected to an earth line 51 through a variable resistor 52 and a potentiometer 53 in series, the potentiometer 53 being pre-set, and the brake pedal of the vehicle serving to move a slider over the resistor 52. The slider on the resistor 52 provides an input to a buffer and inverting amplifier 54 having its other input terminal connected to the line 51, and the lower end of the resistor 43 is connected to the output terminal of the amplifier 54. The result of this is that the potential on the lower end of the resistor 43 varies with the position of the brake pedal, and for this reason a family of braking curves are obtained. Other than this, the arrangement of FIG. 9 is modified as compared with the arrangement of FIG. 8 in that instead of the components 46, F2, B2, there is provided an amplifier 55 which acts in a non-inverting mode or an inverting mode depending on whether it receives a control signal, the control signal being provided so that the amplifier 55 acts in exactly the same way as the components 46, F2, B2 in FIG. 8.

I claim:

1. A control circuit for an electrically driven vehicle comprising in combination a traction motor for driving the vehicle, first contactor means for connecting the motor in circuit to provide forward drive, second contactor means for connecting the motor in circuit to provide electrical braking, control means determining the current in the motor armature, and a control pedal controlling both the selection of the contactor means and the control means to control the level of current in the motor armature in accordance with the setting of the control pedal and the contactor means which has been selected.

2. A control circuit for an electrically driven vehicle, comprising, in combination a traction motor for driving the vehicle, contactor means for connecting the motor in circuit to provide forward drive or electrical braking, control means determining the current in the motor armature, and a control pedal controlling both the contactor means and the level of the current in the motor armature both during forward driving and electrical braking, said circuit including a resistor, means for independently setting the potentials at the first and second ends of said resistor, with the potentials at the first and second ends of said resistor opposite to one another, the control pedal serving to move a slider on said resistor, the slider being connected to the contactor means and the control means, the control means controlling the vehicle in accordance with the magnitude of the signal at the slider, and the contactor means controlling the contactor in accordance with the polarity of the signal of the slider so that if the polarity of the signal at the slider is the same as that at first end of the resistor, forward drive is provided, but if the polarity of the slider is the same as that at the second end of the slider, electrical braking is provided.

3. A circuit as claimed in claim 2 in which means is provided for varying the potentials at the first and second ends of said resistor with vehicle speed.

4. A circuit as claimed in claim 2 in which the vehicle also has a brake pedal providing non-electrical braking of the vehicle, but the potential at said second end of the resistor is determined by the position of said brake pedal.

* * * * *